United States Patent
Kamikake (10) Patent No.: US 10,866,138 B2
(45) Date of Patent: Dec. 15, 2020

(54) SPECTROPHOTOMETER

(71) Applicant: SHIMADZU CORPORATION, Kyoto (JP)

(72) Inventor: Tadafusa Kamikake, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 172 days.

(21) Appl. No.: 16/121,140

(22) Filed: Sep. 4, 2018

(65) Prior Publication Data

US 2019/0072429 A1    Mar. 7, 2019

(30) Foreign Application Priority Data

Sep. 5, 2017 (JP) .................................. 2017-170223

(51) Int. Cl.
*G01J 3/02* (2006.01)
*G01J 3/42* (2006.01)

(52) U.S. Cl.
CPC ........... *G01J 3/0291* (2013.01); *G01J 3/0267* (2013.01); *G01J 3/42* (2013.01)

(58) Field of Classification Search
CPC ........... G01J 3/0267; G01J 3/0291; G01J 3/42
See application file for complete search history.

(56) References Cited

U.S. PATENT DOCUMENTS

| | | | |
|---|---|---|---|
| 4,304,490 A | 12/1981 | Murakoshi et al. | |
| 5,621,523 A | 4/1997 | Oobayashi et al. | |
| 2006/0052944 A1 | 3/2006 | Nagura et al. | |

FOREIGN PATENT DOCUMENTS

| | | |
|---|---|---|
| CN | 203069506 U | 7/2013 |
| DE | 29 43 618 A1 | 5/1980 |
| JP | 6-123694 A | 5/1994 |
| JP | 2002-48700 A | 2/2002 |
| JP | 2006-71329 A | 3/2006 |
| JP | 2006-250836 A | 9/2006 |

OTHER PUBLICATIONS

"UV-VIS Spectrophotometer", UV-1280, SHIMADZU, Jan. 1, 2014, XP055554847, 22 pages total.
Extended European Search Report dated Feb. 25, 2019 issued by the European Patent Office in counterpart application No. 18192523.1.
Communication dated Apr. 24, 2020, from the State Intellectual Property Office of the P.R.C in application No. 201810979666.4.
Communication dated Oct. 6, 2020 by the Japanese Patent Office in application No. 2017-170223.

*Primary Examiner* — Hina F Ayub
(74) *Attorney, Agent, or Firm* — Sughrue Mion, PLLC (57) ABSTRACT

A first cover is in a closed state while being held by a second cover due to holding force exerted from a first holding mechanism. The second cover is in a closed state while being held by a housing due to holding force exerted from a second holding mechanism. The second cover is removable from the housing when force is applied against the holding force exerted from the second holding mechanism. The holding force is set such that, when the first cover is brought into an open state from the closed state, the holding of the first cover by the second cover is released with the second cover being held by the housing.

8 Claims, 11 Drawing Sheets

SPECTROPHOTOMETER

BACKGROUND OF THE INVENTION

Field of the Invention

The present invention relates to a spectrophotometer including: a housing in which a sample chamber with an entrance aperture and an exit aperture for light is formed, the housing having an opening for opening the sample chamber in a first direction and a second direction; and a cover that opens and closes the opening.

Description of the Related Art

In a Fourier transform infrared spectrometer (FTIR) which is one example of spectrophotometers, interfering light is produced due to an interference among lights emitted from a light source, and a sample is irradiated with the produced interfering light in a sample chamber. Then, light passing through the sample or light reflected on the sample is received by a detector to measure a spectrum.

The spectrophotometer of this type generally includes a housing having a sample chamber formed therein and a cover for opening and closing the sample chamber (see, for example, JP-A-2006-250836). The housing is formed with an opening for opening the sample chamber in a first direction (for example, in an upward direction) and a second direction (for example, in a lateral direction), and this opening is opened and closed by the cover. Various accessories are disposed in the sample chamber. To mount or remove the accessories to or from the spectrophotometer, a user mounts or removes the accessories into or from the sample chamber through the opening with the cover being open.

SUMMARY OF THE INVENTION

A spectrophotometer may perform measurement with a gas such as carbon dioxide or water vapor from being removed from the interior of the sample chamber. In such a case, if the opening of the sample chamber is fully opened, an atmosphere inside the sample chamber significantly varies. In view of this, it may be preferable that only a part of the opening (particularly, only an opening on an upper side) is open. When the user performs an easy task to the interior of the sample chamber, it is also preferable that only a part of the opening can be open.

In view of this, a spectrophotometer has been proposed in which a cover is divided into a first cover and a second cover and a sample chamber can be opened only by opening one of the first cover and the second cover. In such a spectrophotometer, an upper opening of the sample chamber can be opened and closed by the first cover (top cover) and a lateral opening of the sample chamber can be opened and closed by the second cover (side cover), for example.

When the user performs an easy task to the interior of the sample chamber or desires to perform a task to the interior of the sample chamber with variation in the atmosphere in the sample chamber being reduced, for example, only the top cover is opened. On the other hand, when the user attaches or removes a large accessory to or from the interior of the sample chamber, not only the top cover but also the side cover is opened.

In the conventional spectrophotometer, the top cover is pivotably mounted to the housing so as to be easily opened and closed, for example. On the other hand, the side cover is mounted to the housing by means of a fixture such as a screw and is openable by removing the fixture according to need. Therefore, the conventional spectrophotometer has a problem of being unable to easily open both the top cover and the side cover.

In view of this, it is considered that the side cover is configured to be detachable without using a fixture to enable easy opening of both the top cover and the side cover. However, this configuration may entail a problem such that, when the top cover is opened, the side cover is inadvertently opened together with the top cover.

The present invention is accomplished in view of the above circumstances and aims to provide a spectrophotometer that enables an opening of a sample chamber to be easily opened in a first direction and in a second direction by using two covers, and that can prevent the other of the two covers from being opened when one of the two covers is opened.

(1) A spectrophotometer according to the present invention includes a housing, a first cover, a second cover, a first holding mechanism, and a second holding mechanism. The housing has, formed therein, a sample chamber with an entrance aperture and an exit aperture for light, and an opening for opening the sample chamber in a first direction and in a second direction. The first cover opens and closes the opening of the sample chamber in the first direction. The second cover opens and closes the opening of the sample chamber in the second direction. The first holding mechanism holds one of the first cover and the second cover in a closed state. The second holding mechanism holds the other cover of the first cover and the second cover in a closed state. The one of the first cover and the second cover is in a closed state while being held by the other cover due to holding force exerted from the first holding mechanism. The other cover is in a closed state while being held by the housing due to holding force exerted from the second holding mechanism, and is removable from the housing when force is applied against the holding force exerted from the second holding mechanism. The holding force is set such that, when the one of the first cover and the second cover is brought into an open state from a closed state, holding of the one of the first cover and the second cover by the other cover is released with the other cover being held by the housing.

According to this configuration, the opening of the sample chamber can be opened in the first direction by the first cover, and the opening of the sample chamber can be opened in the second direction by the second cover. One of the first cover and the second cover is in a closed state while being held by the other cover, and the opening can be easily opened by releasing holding force for holding the one of the first cover and the second cover by the other cover. The other cover is in a closed state while being held by the housing, and the opening can be easily opened by releasing holding force for holding the other cover by the housing. In addition, when one of the first cover and the second cover is brought into an open state, the holding of this cover by the other cover is released with the other cover being held by the housing, which can prevent the other cover from being opened.

(2) At least one of the first holding mechanism and the second holding mechanism may have a magnet for generating the holding force.

According to this configuration, at least one of the first cover and the second cover can be held in a closed state by using the magnet. The holding force of the magnet can be easily released by applying force against the holding force, whereby the opening can be opened more easily.

(3) The other cover may have a guide portion for positioning the other cover when the other cover is attached to the housing.

According to this configuration, when being attached to the housing so as to be in a closed state while being held by the housing, the other cover is easily positioned by means of the guide portion. Therefore, the opening can be opened and closed more easily.

(4) The one of the first cover and the second cover may be detachably attached to the housing.

According to this configuration, the first cover and the second cover are both detachably attached to the housing, whereby the opening can be widely opened by removing both the covers from the housing. This configuration can keep the first cover and the second cover out of the way when a large accessory is mounted into or removed from the sample chamber.

According to the present invention, one of the first cover and the second cover can open the opening more easily by releasing the holding force with respect to the other cover, and the other cover can open the opening more easily by releasing the holding force with respect to the housing. In addition, according to the present invention, when one of the first cover and the second cover is brought into an open state, the holding of this cover by the other cover is released with the other cover being held by the housing, which can prevent the other cover from being opened.

DETAILED DESCRIPTION OF THE PREFERRED EMBODIMENT

1. Outer Appearance of Spectrophotometer

Figure 1:
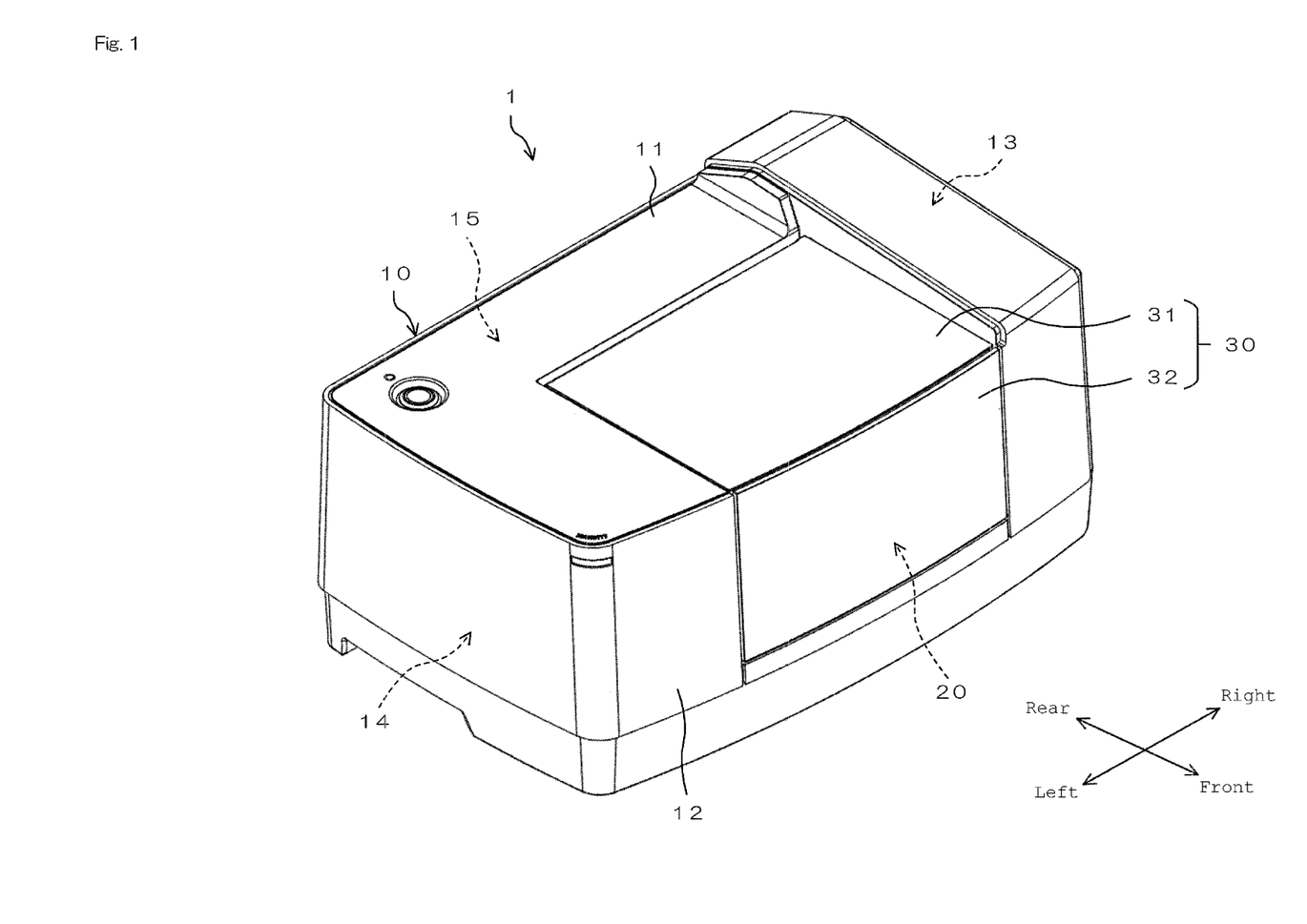
FIG. 1 is a perspective view illustrating an outer appearance of a spectrophotometer according to one embodiment of the present invention.

FIG. 1 is a perspective view illustrating an outer appearance of a spectrophotometer 1 according to one embodiment of the present invention. This spectrophotometer 1 is a Fourier transform infrared spectrometer (FTIR), for example, and an outer shape thereof is defined by a cuboid housing 10. The housing 10 has a sample chamber 20 inside, and the sample chamber 20 can be opened and closed by a cover 30.

A user can perform a task on the housing 10 from front. The cover 30 is provided to extend from an upper surface 11 to a front surface 12 of the housing 10, and the upper side (first direction) and the front side (second direction) of the sample chamber 20 can be open by opening the cover 30. In the present embodiment, the cover 30 is composed of a first cover 31 that covers the upper side of the sample chamber 20 and a second cover 32 that covers the front side of the sample chamber 20.

The housing 10 is a hollow component and has storage sections 13, 14, and 15 for storing various elements on both left and right of the sample chamber 20 and behind the sample chamber 20. Specifically, the storage section 13 on the right of the sample chamber 20 stores a Michelson interferometer (not illustrated) which produces interfering light. The produced interfering light enters the sample chamber 20. The storage section 14 on the left of the sample chamber 20 stores a detector (not illustrated) which detects light emitted from the interior of the sample chamber 20. The storage section 15 behind the sample chamber 20 stores a control board for controlling the operation of the spectrophotometer.

To remove a gas such as carbon dioxide or water vapor, the sample chamber 20 may be purged with a nitrogen gas or dried with a desiccant. In this case, the spectrophotometer 1 performs measurement with the sample chamber 20 being filled with a nitrogen gas or dry air. In addition, the cover 30 may be opened or closed with the sample chamber 20 being filled with a nitrogen gas or dry air.

2. Operation for Opening/Closing Cover

Figure 2:
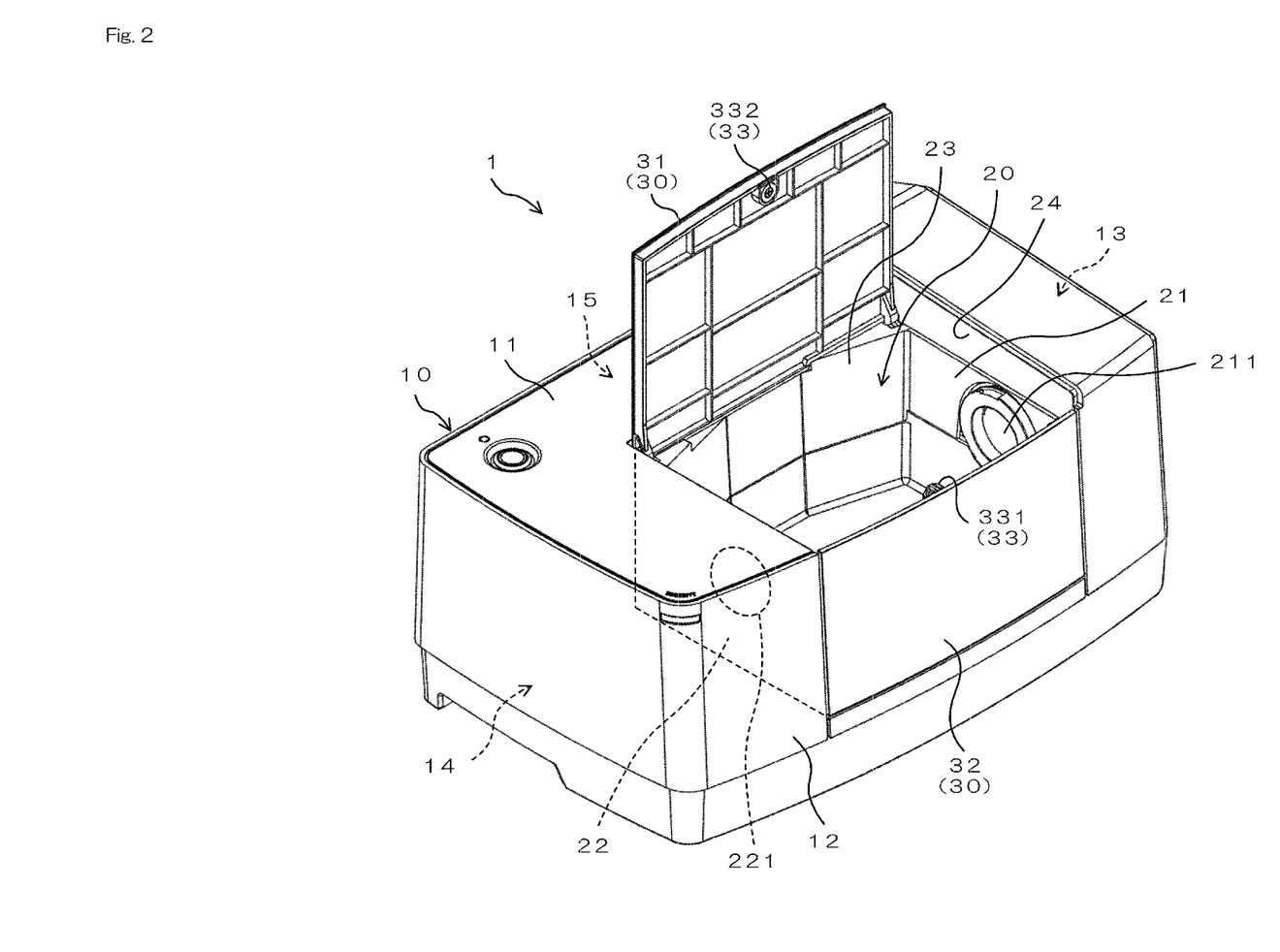
FIG. 2 is a view for describing an operation for opening/closing a cover and illustrates a state where a first cover is opened.
Figure 3:
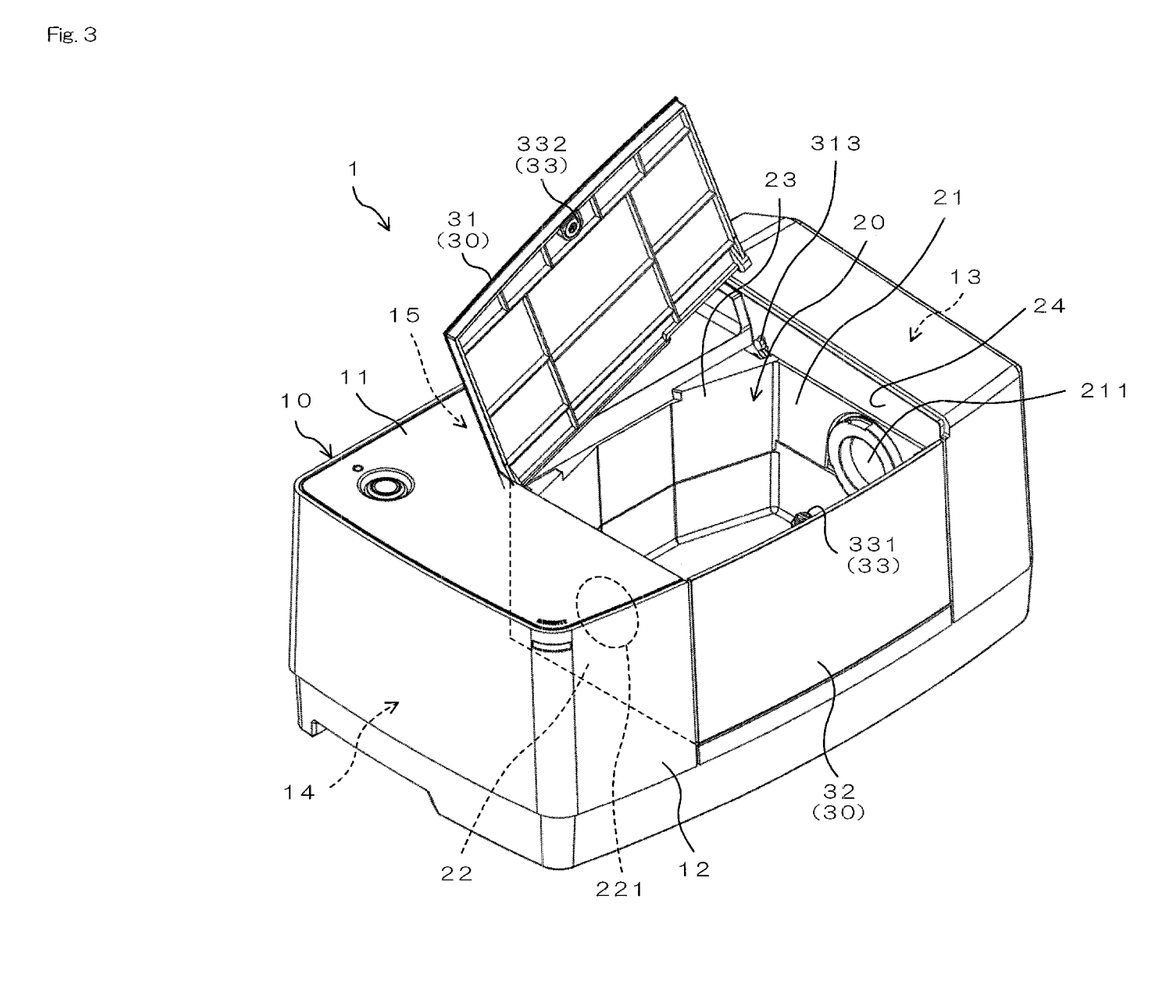
FIG. 3 is a view for describing the operation for opening/closing the cover and illustrates a state during removal of the first cover from a housing.
Figure 4:
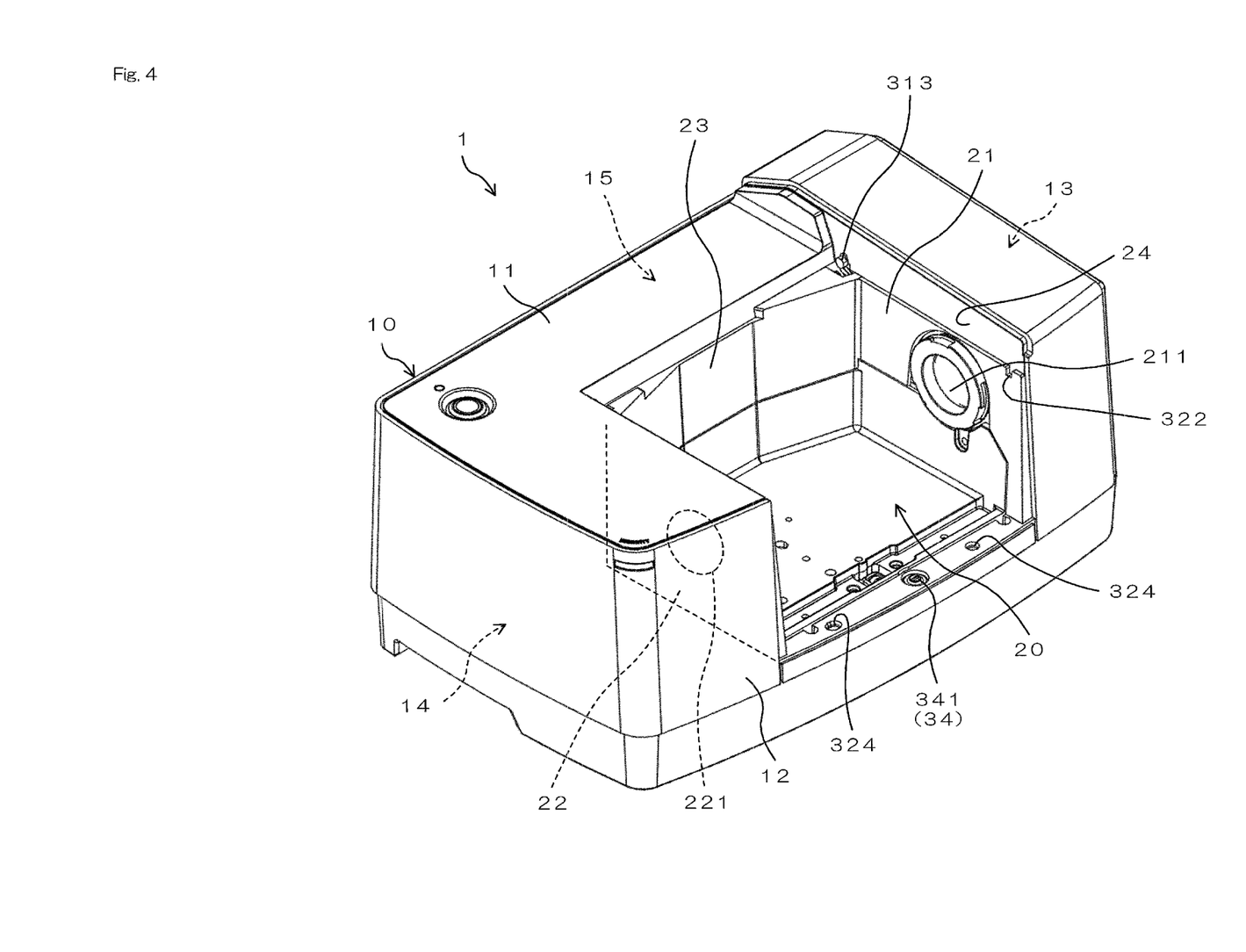
FIG. 4 is a view for describing the operation for opening/closing the cover and illustrates a state where the first cover and a second cover are both removed from the housing.

FIGS. 2 to 4 are views for describing an operation for opening/closing the cover 30. FIG. 2 shows a state where the first cover 31 is opened, FIG. 3 shows a state during removal of the first cover 31 from the housing 10, and FIG. 4 shows a state where the first cover 31 and the second cover 32 are both removed from the housing 10, respectively.

As illustrated in FIGS. 2 to 4, the sample chamber 20 is defined by a right side surface 21, a left side surface 22, and a rear surface 23. The right side surface 21 is formed with an entrance aperture 211 from which interfering light from the Michelson interferometer enters the sample chamber 20. The left side surface 22 is formed with an exit aperture 221 through which light from the sample chamber 20 is emitted toward the detector. As described above, the sample chamber 20 having the entrance aperture 211 and the exit aperture 221 for light is formed inside the housing 10.

The sample chamber 20 is configured such that the upper surface thereof is opened and one of four side surfaces is opened. In the present embodiment, an opening 24 for opening the upper side and the front side of the sample chamber 20 is formed, and this opening 24 is opened and closed by the cover 30 (the first cover 31 and the second cover 32). Specifically, the first cover 31 opens and closes the opening 24 on the upper side of the sample chamber 20, while the second cover 32 opens and closes the opening 24 on the front side of the sample chamber 20. The opening 24 is continuously formed from the upper side to the front side of the sample chamber 20.

With at least one of the first cover 31 and the second cover 32 being opened, accessories (not illustrated) are mounted into or removed from the sample chamber 20 through the opening 24. Examples of the accessories include a sample holder for holding a sample, a cell, and a measurement mechanism including a plurality of mirrors. Examples of the measurement mechanism include a total reflection measurement mechanism, a regular reflection measurement mechanism, a diffuse reflection measurement mechanism, a transmission measurement mechanism, and a minute sample measurement mechanism.

The first cover 31 and the second cover 32 can be independently opened and closed. As illustrated in FIG. 2, if only the first cover 31 is opened, the upper side of the sample chamber 20 can be opened with the front side of the sample chamber 20 being closed by the second cover 32. In addition, in the present embodiment, the first cover 31 can be removed from the housing 10 as illustrated in FIG. 3. Further, the front side of the sample chamber 20 can be opened by removing the second cover 32 from the housing 10 as illustrated in FIG. 4.

3. Specific Configuration of Cover

Figure 5:
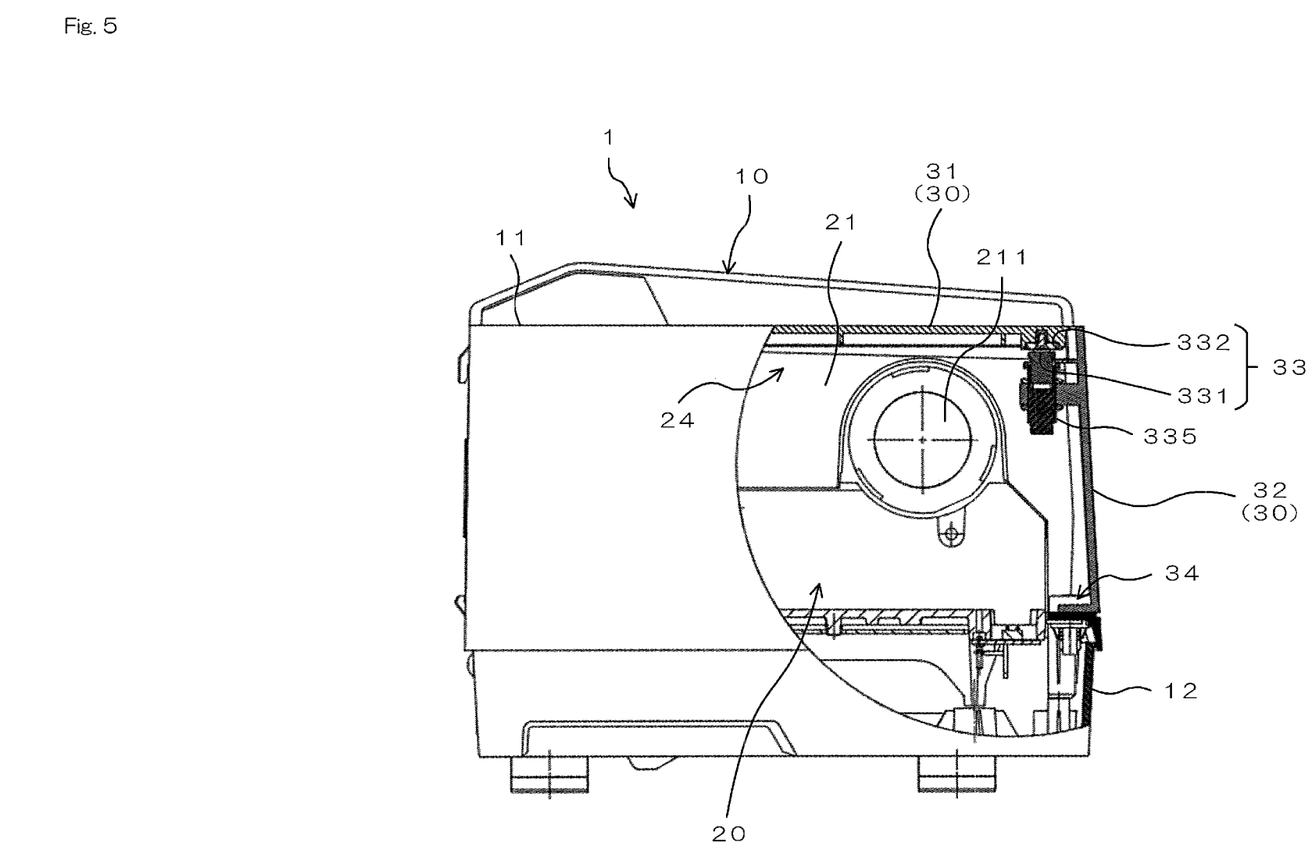
FIG. 5 is a partially cutaway side view of the spectrophotometer.
Figure 6:
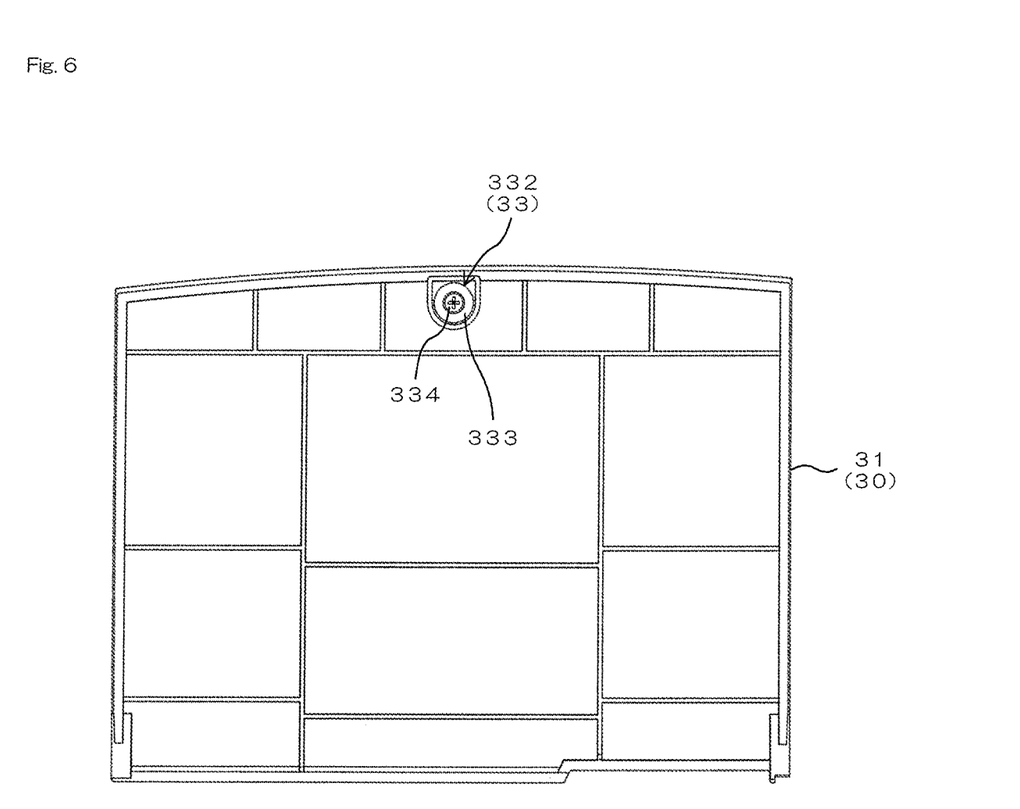
FIG. 6 is an external bottom view of the first cover.
Figure 7:
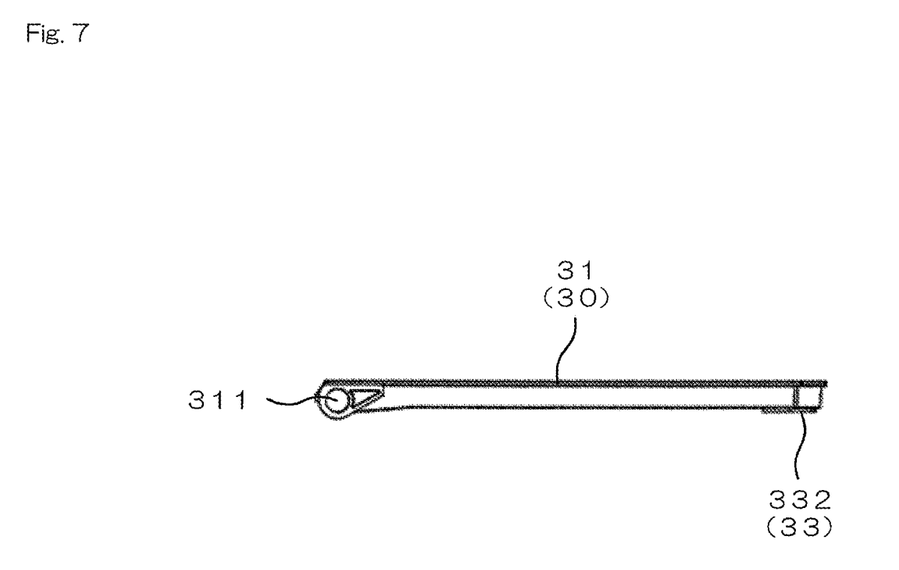
FIG. 7 is an external left side view of the first cover.
Figure 8:
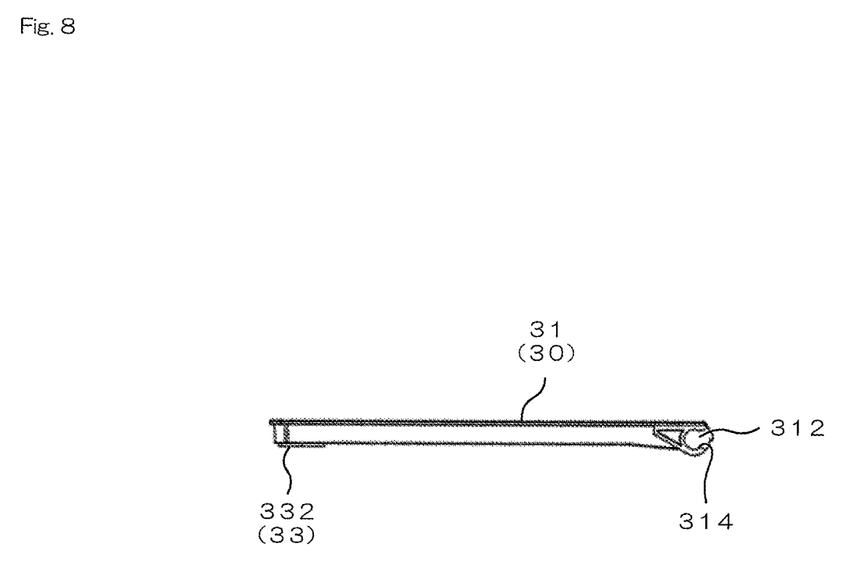
FIG. 8 is an external right side view of the first cover.
Figure 9:
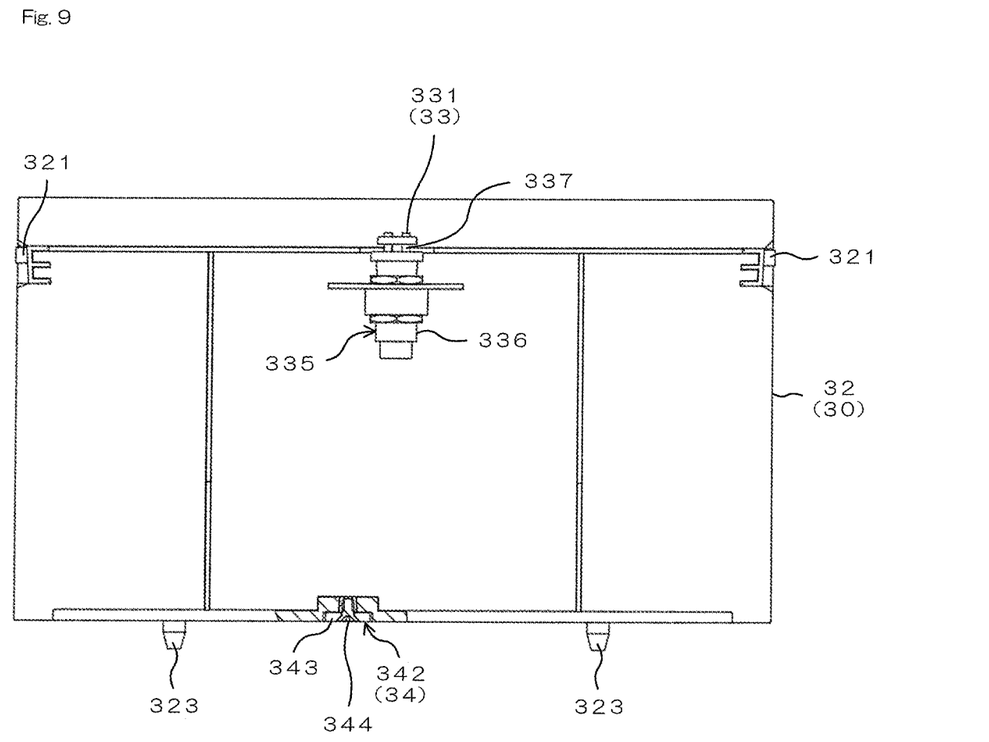
FIG. 9 is an external rear view of the second cover.
Figure 10:
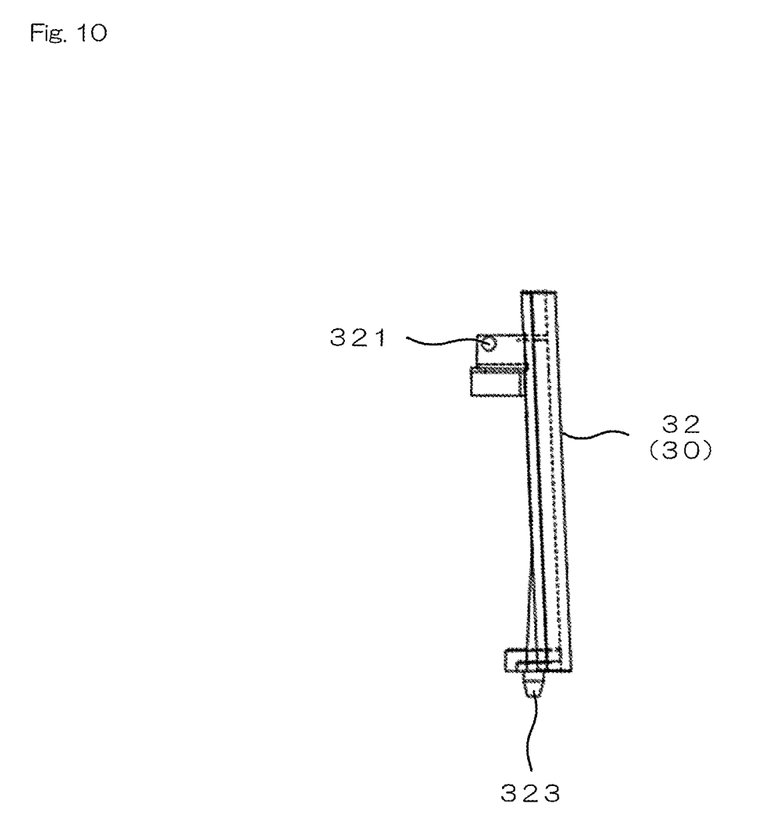
FIG. 10 is an external left side view of the second cover.
Figure 11:
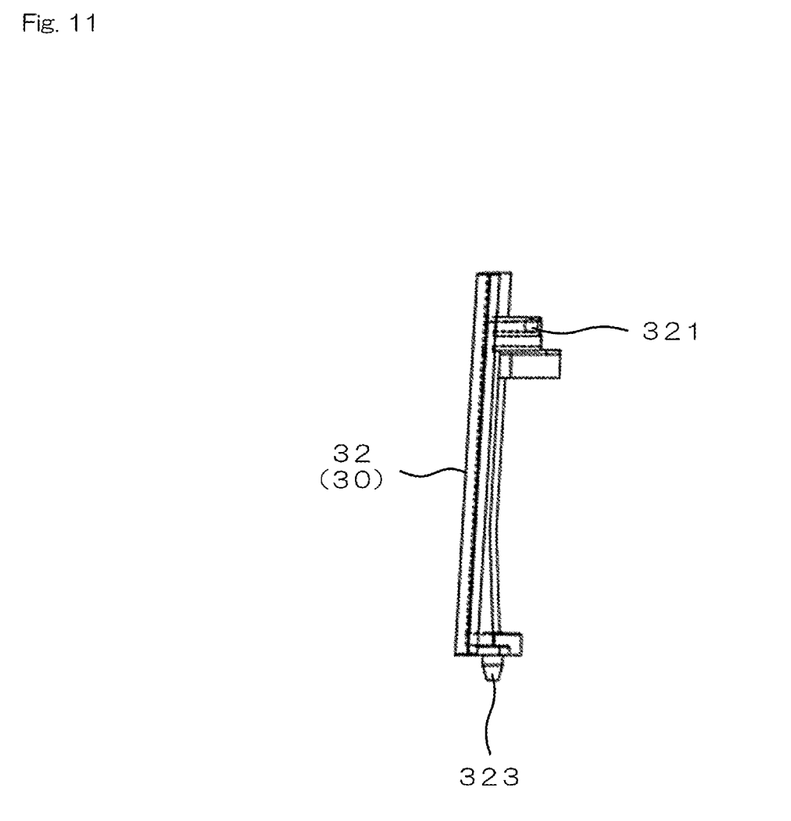
FIG. 11 is an external right side view of the second cover.

FIG. 5 is a partially cutaway side view of the spectrophotometer 1. FIGS. 6 to 8 are external views of the first cover 31, in which FIG. 6 is a bottom view, FIG. 7 is a left side view, and FIG. 8 is a right side view. FIGS. 9 to 11 are external views of the second cover 32, in which FIG. 9 is a rear view, FIG. 10 is a left side view, and FIG. 11 is a right side view.

As illustrated in FIGS. 1 to 11, the first cover 31 is held in a closed state by a first holding mechanism 33, and the second cover 32 is held in a closed state by a second holding mechanism 34. The first cover 31 is in a closed state while being held by the second cover 32 due to holding force exerted from the first holding mechanism 33 (the state in FIGS. 1 and 5). On the other hand, the second cover 32 is in a closed state while being held by the housing 10 due to holding force exerted from the second holding mechanism 34 (the state in FIGS. 1 to 3 and 5).

The first holding mechanism 33 includes a magnet 331 and a metal part 332. The magnet 331 is a permanent magnet, for example, and attached to the second cover 32. On the other hand, the metal part 332 is at least partially made of a magnetic body and attached to the first cover 31. The magnet 331 and the metal part 332 are disposed on positions facing each other when the first cover 31 is closed. Therefore, when the first cover 31 is closed, the magnet 331 and the metal part 332 stick to each other by magnetic force (holding force), and thus, the first cover 31 is held by the second cover 32 in a closed state.

As illustrated in FIGS. 7 and 8, the first cover 31 is provided with hinge sockets 311 and 312 at rear ends of both left and right side surfaces. Support shafts 313 are provided at the rear side edge of the upper end of the opening 24 in the housing 10 at positions corresponding to the hinge sockets 311 and 312 of the first cover 31, respectively (see FIGS. 3 and 4). The support shafts 313 project from the side edge of the opening 24 so as to extend in the horizontal direction and are engaged with the hinge sockets 311 and 312, respectively. This structure enables the first cover 31 to rotate around the support shafts 313.

The hinge socket 311 formed on one side surface (in the present embodiment, the left side surface) of the first cover 31 is defined by a cylindrical wall face as illustrated in FIG. 7. Therefore, even if trying to move the first cover 31 in a direction perpendicular to the horizontal direction with the support shaft 313 being engaged with the hinge socket 311, the user cannot move the first cover 31 due to the support shaft 313 getting stuck in the hinge socket 311.

On the other hand, the hinge socket 312 formed on the other side surface (in the present embodiment, the right side surface) of the first cover 31 is configured such that a cutout 314 is formed on a part of a cylindrical wall face as illustrated in FIG. 8. According to this structure, when trying to move the first cover 31 in the direction perpendicular to the horizontal direction with the support shaft 313 being engaged with the hinge socket 312, the user can move the first cover 31 and remove the hinge socket 312 from the support shaft 313 only when the user applies force in a predetermined direction.

In the present embodiment, the cutout 314 of the hinge socket 312 is located on a lower side in a state where the first cover 31 is opened as illustrated in FIG. 2, that is, in a state where the first cover 31 extends vertically. When the right end of the first cover 31 is lifted up with this state, the hinge socket 312 can be removed from one of the support shafts 313 as illustrated in FIG. 3. When the first cover 31 is then moved to the right, the hinge socket 311 can be removed from the other support shaft 313. As described above, in the present embodiment, the first cover 31 is detachable from the housing 10.

The metal part 332 of the first holding mechanism 33 has a washer 333 and a screw 334 as illustrated in FIG. 6. The washer 333 is a torus member, and the washer 333 and the screw 334 can be mounted to the first cover 31 by inserting the screw 334 into the washer 333 and tightening the screw 334 on the first cover 31.

As illustrated in FIG. 9, the magnet 331 of the first holding mechanism 33 is held by a catcher 335. The catcher 335 has a cylindrical housing 336 and a rod-shaped yoke 337 inserted into the cylindrical housing 336. The magnet 331 is provided on an upper end face of the yoke 337. The magnet 331 and the catcher 335 constitute what is called a magnetic catch. Note that the magnetic catch is not illustrated in FIGS. 10 and 11.

The yoke 337 is movable in the vertical direction in relation to the cylindrical housing 336 fixed to the second cover 32 and is biased upward by a spring (not illustrated) provided in the cylindrical housing 336. When pushed downward in a certain amount against the biasing force of the spring, the yoke 337 is latched at that position. If pushed downward further in this state, the yoke 337 is unlatched and moves upward by the biasing force of the spring.

Specifically, when the first cover 31 is closed as illustrated in FIGS. 1 and 5, the front end of the first cover 31 is pushed downward, and thus, the yoke 337 of the catcher 335 moves downward by the metal part 332 of the first holding mechanism 33 and is latched. Thus, the first cover 31 is in a closed state. In this state, the magnet 331 and the metal part 332 stick to each other due to magnetic force.

To open the first cover 31, the user pushes the front end of the first cover 31 downward to unlatch the yoke 337. Thus, the yoke 337 moves upward by the biasing force of the spring. Accordingly, the front end of the first cover 31 is lifted up, and the user can grip the lifted front end. In this state, the magnet 331 and the metal part 332 remain sticking to each other by the magnetic force. However, the user can open the first cover 31 as illustrated in FIG. 2 by lifting up the front end of the first cover 31 against the magnetic force and rotating the first cover 31 around the support shafts 313.

The second holding mechanism 34 includes a magnet 341 and a metal part 342. The magnet 341 is a permanent magnet, for example, and attached to the housing 10. On the other hand, the metal part 342 is at least partially made of a magnetic body and attached to the second cover 32. The magnet 341 and the metal part 342 are disposed on positions facing each other when the second cover 32 is closed. Therefore, when the second cover 32 is closed, the magnet 341 and the metal part 342 stick to each other by magnetic force (holding force), and thus, the second cover 32 is held by the housing 10 in a closed state.

As illustrated in FIGS. 9 to 11, the second cover 32 is provided with guide portions 321 at upper ends of both left and right side surfaces. Grooves 322 are formed at the front side edge of the upper end of the opening 24 in the housing 10 at positions corresponding to the guide portions 321 of the second cover 32, respectively (see FIG. 4). The respective guide portions 321 project from the side surfaces of the second cover 32 in the horizontal direction and are engaged with the respective grooves 322 from above. With this, the second cover 32 is positioned so as to extend vertically, and in this state, the second cover 32 is attached to the housing 10 so as to be in a closed state.

Protrusions 323 protruding downward are provided on the lower end face of the second cover 32. In the present embodiment, two protrusions 323 are provided spaced from each other. However, the second cover 32 may have only one protrusion 323 or three or more protrusions 323. Recesses 324 are formed on the lower end of the opening 24 in the housing 10 at positions corresponding to the respective protrusions 323 of the second cover 32 (see FIG. 4). When the second cover 32 is attached to the housing 10 so as to be in a closed state, the respective protrusions 323 are inserted into the corresponding recesses 324.

To open the second cover 32, upward force is applied to the second cover 32 against the magnetic force (holding force) exerted from the magnet 341 of the second holding mechanism 34. Thus, the second cover 32 is removed from the housing 10 and is brought into an open state as illustrated in FIG. 4.

The metal part 342 of the second holding mechanism 34 has a washer 343 and a screw 344 as illustrated in FIG. 9. The washer 343 is a torus member, and the washer 343 and the screw 344 can be mounted to the second cover 32 by inserting the screw 344 into the washer 343 and tightening the screw 344 on the second cover 32.

The washer 343 and the screw 344 of the metal part 342 of the second holding mechanism 34 are both made of a magnetic body (ferromagnetic body). On the other hand, in the metal part 332 of the first holding mechanism 33, only one of the washer 333 and the screw 344 is made of a magnetic body and the other is made of a non-magnetic body. In the present embodiment, the washer 333 is made of a magnetic body and the screw 344 is made of a non-magnetic body. The magnetic body may be iron, and the non-magnetic body may be stainless, for example. However, they are not limited thereto.

According to the configuration described above, comparing the first holding mechanism 33 and the second holding mechanism 34, the holding force for the second cover 32 by the second holding mechanism 34 is set greater than the holding force for the first cover 31 by the first holding mechanism 33. Accordingly, when the first cover 31 is brought into the state (open state) illustrated in FIG. 2 from the state (closed state) illustrated in FIG. 1, the holding of the first cover 31 by the second cover 32 is released with the second cover 32 being held by the housing 10.

It is preferable that the first holding mechanism 33 and the second holding mechanism 34 are provided in a same plane substantially parallel to the second cover 32. It is also preferable that the direction in which the holding force by the first holding mechanism 33 is released and the direction in which the holding force by the second holding mechanism 34 is released are the same. In the present embodiment, the direction in which the holding force by the first holding mechanism 33 is released and the direction in which the holding force by the second holding mechanism 34 is released are the vertical direction. However, they are not limited thereto, and may be any other directions.

4. Operation and Effects (1) In the present embodiment, the opening 24 on the upper side of the sample chamber 20 can be opened by the first cover 31, and the opening 24 on the front side of the sample chamber 20 can be opened by the second cover 32. The first cover 31 is in a closed state while being held by the second cover 32, and the opening 24 can be easily opened by releasing holding force for holding the first cover 31 by the second cover 32. The second cover 32 is in a closed state while being held by the housing 10, and the opening 24 can be easily opened by releasing holding force for holding the second cover 32 by the housing 10. In addition, when the first cover 31 is brought into an open state, the holding of the first cover 31 by the second cover 32 is released with the second cover 32 being held by the housing 10, which can prevent the second cover 32 from being opened.

(2) Particularly, in the present embodiment, the first cover 31 and the second cover 32 can be held in a closed state by means of the magnets 331 and 341. The holding force of the magnets 331 and 341 can be easily released by applying force against the holding force, whereby the opening 24 can be opened more easily.

(3) In the present embodiment, when the second cover 32 is attached to the housing 10 so as to be in a closed state while being held by the housing 10, the second cover 32 is easily positioned by means of the guide portions 321. Therefore, the opening 24 can be opened and closed more easily.

(4) In the present embodiment, the first cover 31 and the second cover 32 are both detachably attached to the housing 10, whereby the opening 24 can be widely opened as illustrated in FIG. 4 by removing both the covers 31 and 32 from the housing 10. This configuration can keep the first cover 31 and the second cover 32 out of the way when a large accessory is mounted into or removed from the sample chamber 20.

5. Modifications

The above embodiment has described that the holding force of the first holding mechanism 33 and the holding force of the second holding mechanism 34 are different from each other by the washers 333 and 343 in the magnets 331 and 341 being made of different materials from each other. However, the configuration is not limited thereto. For example, the holding force of the first holding mechanism 33 and the holding force of the second holding mechanism 34 may differ from each other by a configuration where the number of magnets 331 in the first holding mechanism 33 and the number of magnets 341 in the second holding mechanism 34 are different from each other or a configuration where the size of the magnet 331 and the size of the magnet 341 are different from each other.

The first holding mechanism 33 and the second holding mechanism 34 are not limited to generate holding force by magnetic force, and they may employ a configuration for generating holding force by other than magnetic force. For example, at least one of the first holding mechanism 33 and the second holding mechanism 34 may be configured to generate holding force by a pair of engageable members. In this case, it can be configured such that the holding force of the first holding mechanism 33 and the holding force of the second holding mechanism 34 are different from each other by appropriately setting the engagement force between the pair of members (force required to release the engagement).

The above embodiment has described that the opening 24 is formed to extend from the upper surface 11 to the front surface 12 of the housing 10. However, it is not limited thereto, and the opening 24 may be formed to extend from the upper surface 11 to another side surface (left side surface, right side surface, or rear surface) of the housing 10. In this case, the second cover 32 is not limited to open and close the opening 24 on the front of the sample chamber 20, but may open and close the opening 24 on the other lateral sides (on the left, right, or rear) of the sample chamber 20. In addition, the first direction is not limited to an upward direction and the second direction is not limited to a lateral direction (front, left, right, or rear). Any configuration may be employed, as long as the sample chamber 20 can be opened in two different directions.

The configuration for enabling the second cover 32 to be detachably attached to the housing 10 is not limited to the configuration using the hinge sockets 311 and 312 as described above. The second cover 32 may be detachably attached with other configurations. In addition, the second cover 32 may not be detachably attached to the housing 10.

The present invention is not limited to be configured such that the first cover 31 is in a closed state while being held by the second cover 32 and the second cover 32 is in a closed state while being held by the housing 10, and may be configured such that the second cover 32 is in a closed state while being held by the first cover 31 and the first cover 31 is in a closed state while being held by the housing 10. In this case, the holding force of the first holding mechanism for holding the second cover 32 in a closed state and the holding force of the second holding mechanism for holding the first cover 31 in a closed state may be set such that, when the second cover 32 is brought into an open state from the closed state, the holding of the second cover 32 by the first cover 31 is released with the first cover 31 being held by the housing 10.

In the above embodiment, a Fourier transform infrared spectrometer has been described as one example of the spectrophotometer 1. However, the present invention is applicable to other spectrophotometers such as an ultraviolet-visible spectrophotometer.

What is claimed is:

1. A spectrophotometer comprising:
    a housing in which a sample chamber with an entrance aperture and an exit aperture for light is formed, the housing having an opening for opening the sample chamber in a first direction and in a second direction;
    a first cover that opens and closes the opening of the sample chamber in the first direction;
    a second cover that opens and closes the opening of the sample chamber in the second direction;
    a first holding mechanism that holds one of the first cover and the second cover in a closed state; and
    a second holding mechanism that holds the other cover of the first cover and the second cover in a closed state,
    wherein
    the one of the first cover and the second cover is in a closed state while being held by the other cover due to holding force exerted from the first holding mechanism,
    the other cover is in a closed state while being held by the housing due to holding force exerted from the second holding mechanism, and is removable from the housing when force is applied against the holding force exerted from the second holding mechanism,
    the first holding mechanism and the second holding mechanism are configured such that, when the one of the first cover and the second cover is brought into an open state from a closed state, holding of the one of the first cover and the second cover by the other cover is released with the other cover being held by the housing, and
    comparing the first holding mechanism and the second holding mechanism, the holding force for the second cover by the second holding mechanism is set greater than the holding force for the first cover by the first holding mechanism.

2. The spectrophotometer according to claim 1, wherein at least one of the first holding mechanism and the second holding mechanism has a magnet for generating the holding force.

3. The spectrophotometer according to claim 1, wherein the other cover has a guide portion for positioning the other cover when the other cover is attached to the housing.

4. The spectrophotometer according to claim 1, wherein the one of the first cover and the second cover is detachably attached to the housing.

5. The spectrophotometer according to claim 1, wherein the first holding mechanism and the second holding mechanism each have a magnet for generating the holding force.

6. The spectrophotometer according to claim 1, wherein a direction in which the holding force by the first holding mechanism is released and a direction in which the holding force by the second holding member are released are the same.

7. The spectrophotometer according to claim 1, wherein the first cover is pivotally attached to the housing.

8. The spectrophotometer according to claim 7, wherein the first cover covers a top part of the sample chamber.

* * * * *

UNITED STATES PATENT AND TRADEMARK OFFICE
CERTIFICATE OF CORRECTION

PATENT NO. : 10,866,138 B2
APPLICATION NO. : 16/121140
DATED : December 15, 2020
INVENTOR(S) : Tadafusa Kamikake It is certified that error appears in the above-identified patent and that said Letters Patent is hereby corrected as shown below:

On the Title Page

Column 1, item (72), please correct the Inventor name as follows:
Delete "Tadafusa Kamikake, Kyoto (JP)"
Insert --Tadafumi Kamikake, Kyoto (JP)--

Signed and Sealed this
Twelfth Day of November, 2024

Katherine Kelly Vidal
*Director of the United States Patent and Trademark Office*